United States Patent
Muramatsu et al.

(10) Patent No.: US 6,430,324 B1
(45) Date of Patent: Aug. 6, 2002

(54) OPTICAL PROBE AND METHOD FOR MANUFACTURING SAME AND SCANNING PROXIMITY FIELD OPTICAL MICROSCOPE

(75) Inventors: Hiroshi Muramatsu; Katsunori Honma; Norio Chiba; Noritake Yamamoto; Akira Egawa, all of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/378,209

(22) Filed: Aug. 19, 1999

(51) Int. Cl.[7] ................................................. G02B 6/26
(52) U.S. Cl. .......................................... 385/12; 385/13
(58) Field of Search ............................ 385/12, 13, 117; 356/501; 250/306, 311; 600/129, 182; 606/15, 16; 607/93; 65/283, 276, 269, 108, 112, 113, 60.4

(56) References Cited

U.S. PATENT DOCUMENTS

| | | |
|---|---|---|
| 4,917,462 A | 4/1990 | Lewis et al. |
| 5,294,790 A * | 3/1994 | Ohta et al. ............... 250/216 |
| 5,677,978 A * | 10/1997 | Lewis et al. ............. 385/147 |
| 5,789,742 A * | 8/1998 | Wolff .................... 250/227.11 |
| 5,960,147 A * | 9/1999 | Muramatsu et al. ...... 385/123 |

FOREIGN PATENT DOCUMENTS

| | | |
|---|---|---|
| JP | 7174542 | 7/1995 |
| JP | 9203722 | 8/1997 |

* cited by examiner

*Primary Examiner*—John D. Lee
*Assistant Examiner*—Michael J Stahl
(74) *Attorney, Agent, or Firm*—Adams & Wilks

(57) ABSTRACT

A proximity field optical microscope is provided which can simultaneously conduct optical observation in the ultraviolet and infrared light ranges and conduct geometrical observation and detect other physical information, wherein a microscopic opening is stably and easily formed in a probe tip with low manufacturing cost and high yield. The microscope has an optical probe which comprises a tube having a tip portion formed with a smaller diameter than an overall diameter of the tube, an optically opaque material coated on the tube, an optical microscope opening formed at the tip portion, and an optical waveguide having at least two optical end surfaces, one end surface being inserted in the tube facing the microscopic opening.

25 Claims, 4 Drawing Sheets

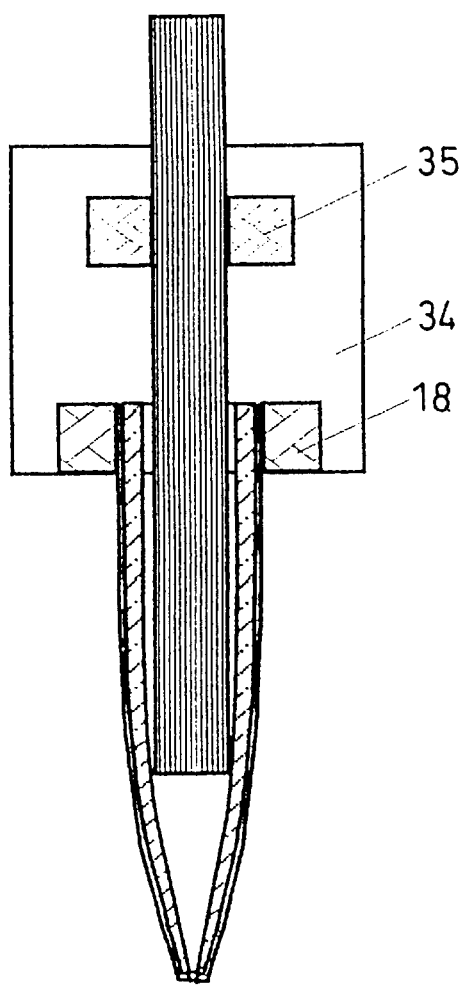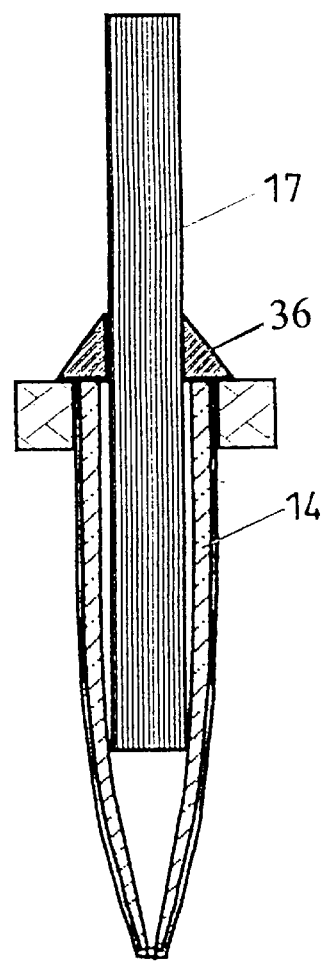
F I G. 7   F I G. 8

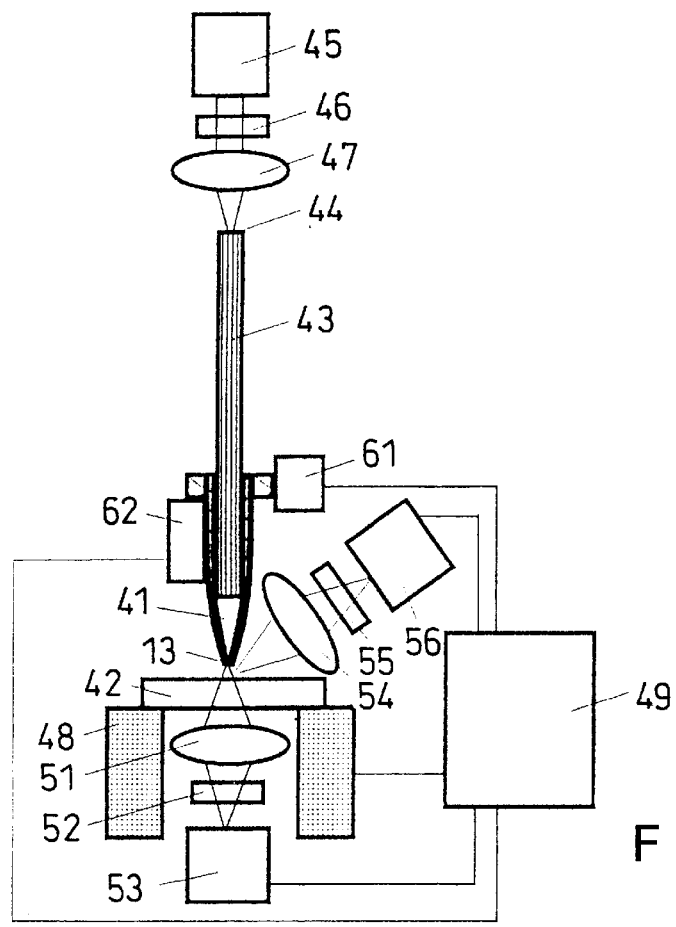
F I G. 9
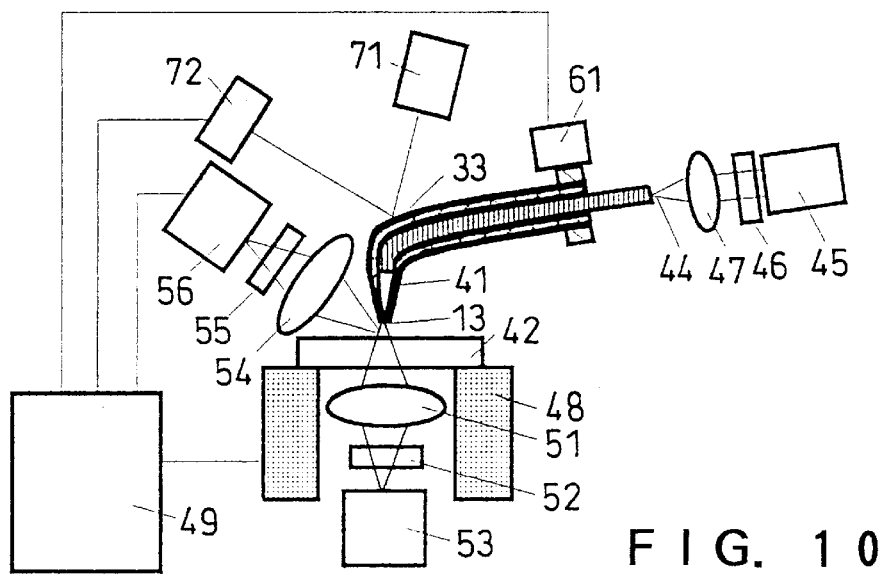
F I G. 10

OPTICAL PROBE AND METHOD FOR MANUFACTURING SAME AND SCANNING PROXIMITY FIELD OPTICAL MICROSCOPE

BACKGROUND OF THE INVENTION

The present invention relates to an optical probe and scanning proximity field optical microscope for observing sample surface microscopic geometries and optical properties.

The conventional proximity field optical microscopes have generally used a probe formed by sharpening a tip of a light transmission member such as an optical fiber and coating a portion other than the tip to form a microscopic opening at the tip. The light transmission member principally used an optical fiber. However, if the optical fiber is used as a base material, the transmissible light wavelength is used at approximately 350–1600 nm and inapplicable for observation in a wavelength range of an ultraviolet or infrared portion of light. Furthermore, the metal coating process involves difficulty in manufacture by requiring evaporation while rotating the optical fiber, etc.

Meanwhile, there has been a proposal for an atomic force microscope probe made of silicon or silicon nitride and having a bore formed through a probe needle tip to an opposite surface. Since no light-absorbing solid substance exists within the bore extending from the opening to the backside, a such structure is applicable for observation in an ultraviolet or infrared wavelength range.

The conventional optical probe manufacturing process with an using an optical fiber requires be evaporation to be conducted optical fiber, etc. rotated during the metal coating process, as described above. In such a case, precise control is required for evaporation angle or optical fiber tip form. There is a problem in that if a change is induced, even if slight, it might greatly influence the yield.

The manufacturing process for a type of an atomic force microscope probe having a bore formed therein as described above includes a method of forming a bore through etching and a method of forming a bore using a focused ion beam. The process using etching is used to form a through hole or opening by etching wherein the etching has to be stopped at a certain time. However it is practically impossible to conduct etching while monitoring the formation of such a microscopic opening. As a result, there is extreme difficulty in controlling the size of an opening to be formed. The method using a focused ion beam to form an opening, on the other hand, has a problem in that producibility is low and hence cost of manufacture becomes high. Furthermore, there is another problem in that a bore might be formed in a position than the needle tip due to positional deviation caused by drift of the focused ion beam apparatus.

From these points of view, it is essentially required to provide a proximity field optical microscope having a high controllability in microscopic opening formation in order to utilize the proximity field optical observation technology. There is, as one method for realizing this, a method to use a microscopic opening at a tip of a tube broken by thermal extension as Lewis et al. and Shalone et al. have proposed (U.S. Pat. No. 4,917,462 (1990); Rev. Sci. Instrum. 63 (1992) 4601). In this case, the control of probe-to-sample distance is under STM or shear force control. The use of AFM or STM control poses a problem in that the sample has to possess conductivity. Also, where light is introduced from an end of a tube, the light is required to propagate over a long distance through the inside of the tube resulting in an increase in light loss.

In the case of shear force control, the probe is horizontally vibrated relative to a sample and accordingly usable if the sample has no conductivity. However, simultaneous observation of other physical properties of the sample surface is impossible to conduct despite being possible with the AFM control. The other physical properties referred to herein are friction, viscoelasticity, surface potential, etc. to control the probe by a vertical force onto the sample friction thereby enabling detection. Furthermore, the shear force control method poses a problem in that it requires an on-sample space larger than that of the AFM or STM control method. The reports by Shalone et al. include a bent tube probe for use as an AFM probe. In this case, light is not successfully propagated through the tube bent portion. Accordingly, it is difficult to provide a sufficient amount of light emitted through the bore at the tip.

SUMMARY OF THE INVENTION

In order to solve the above problem, the present inventors have devised an optical probe, comprising a tip having a diameter made smaller with respect to an overall diameter; an optically opaque material coated thereon; a tube having an optical microscopic opening formed at a tip thereof; and an optical waveguide having at least two optical end surfaces; wherein the optical waveguide at a one end surface is inserted in an glass tube in a state directed to a microscopic opening.

By making the tube by a glass tube, manufacturing is facilitated. In this case, where using a light with a wavelength transmissible through the glass, light leakage can be prevented by coating at least an outer side of a taper portion with an electromagnetically shielding material such as metal. It is possible to cope with various wavelengths by arbitrarily selecting a corresponding wavelength to the optical waveguide.

Meanwhile, where performing control on a distance between the sample and the probe under atomic force control, if an optical lever is used, detection can be made stably by forming a mirror surface on a tube surface opposite to an opening.

A method for manufacturing an optical probe, includes a method comprising the steps in the order of: (1) elongating and breaking a glass tube; (2) inserting a waveguide; therein and (3) coating with metal, wherein the metal coating is made after the waveguide insertion. Also, a method, comprising the steps in the order of: (1) elongating and breaking a glass tube; (2) coating with metal; and (3) inserting a waveguide, wherein the waveguide is inserted after the metal coating. The latter method of inserting a waveguide after metal coating is superior in mass-producibility because a greater number of probes can be put in a film forming apparatus for metal coating.

Further, a scanning proximity field optical microscope can be structured by at least a light source, a focusing optical system, a relative moving means for causing relative movement between a probe and a sample, a photo detector and the above-mentioned optical probe.

BRIEF DESCRIPTION OF THE DRAWINGS

FIG. 7 is a typical view showing a structure of an optical probe of the present invention;

FIG. 8 is a typical view showing a structure of an optical probe of the present invention;

FIG. 9 is a typical view showing a structure of a scanning proximity field optical microscope of the present invention; and FIG. 10 is a typical view showing a structure of a scanning proximity field optical microscope of the present invention.

DETAILED DESCRIPTION OF THE PREFERRED EMBODIMENTS

Now the present invention will be described in detail with reference to the drawings.

Figures 1, 2, 3A, 3B:
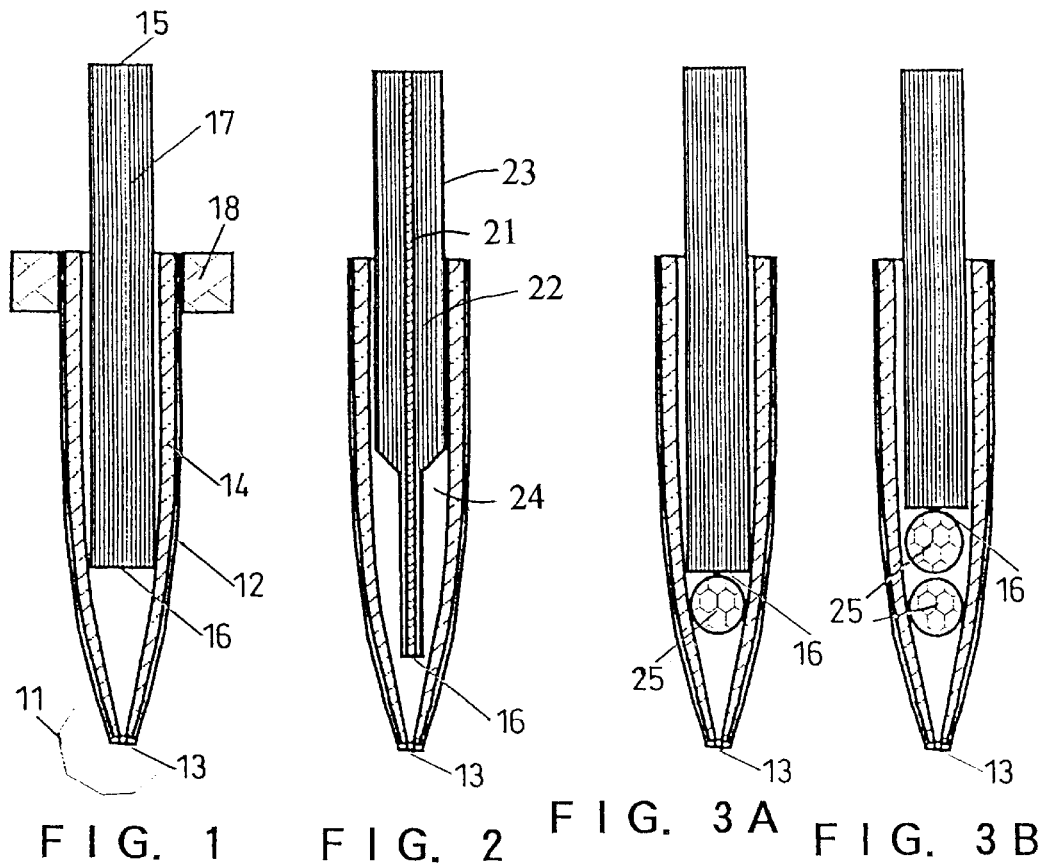
FIG. 1 is a typical view showing the structure of an optical probe of the present invention.
FIG. 2 is a typical view showing the structure of an optical probe of the present invention.
FIGS. 3A and 3B are typical views showing the structure of an optical probe of the present invention.

FIG. 1 shows typically an optical probe of the present invention. In FIG. 1, the optical probe has a tip portion 11 reduced in diameter relative to the overall probe diameter. The optical probe is formed by a tube 14 coated with an optically opaque film 12 such as an electromagnetic shield film, which has at its tip a microscopic optical opening 13 and an optical waveguide 17 having at least two optical end faces 15, 16. The optical waveguide 17 is partly inserted in the tube 14 such that its one end face 16 is directed through a tube interior to the microscopic opening 13. Also, the tube 14 is fixed by a support part 18 so that the tube can be deformed or vibrated due to the springiness of the tube.

An optical probe shown in FIG. 2 has an inserted waveguide having an end face 16 positioned closer to the microscopic opening 13 in order to enhance light propagation efficiency. The optical waveguide 23 has a core 21 and clad 22, wherein part of the clad 24 of the inserted waveguide is removed to partly reduce the diameter of the waveguide, thereby enabling the waveguide to be inserted deeper. It is possible to select the number of ball lenses 25 in accordance with a distance between the waveguide end face 16 and the microscopic opening 13 and a focal length of the ball lens.

Furthermore, it is possible to insert a ball lens 25 between the inserted optical waveguide end face 16 and the microscopic opening 13 within the tube in order to increase the efficiency of light propagation from the inserted optical waveguide end face 16 to the microscopic opening 13. FIG. 3A and FIG. 3B illustrate typical views respectively having one and two ball lenses inserted.

Figure 4:
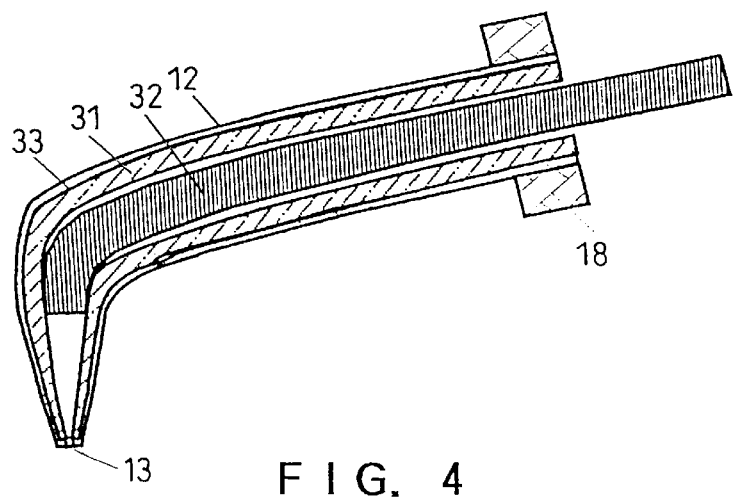
FIG. 4 is a typical view showing the structure of an optical probe of the present invention.

FIG. 4 shows a probe having a structure having a tube bent at one part, which structure is used to detect a vertical force relative to a sample. In FIG. 4, the tube 31 bent at a part close to its tip has therein a waveguide 32 having been bent at the inside simultaneously with the bending of the tube. A reflective mirror surface 33 is formed, if required, on the tube 31. This mirror is used to optically detect a deflection of the probe. Furthermore, the tube 31 is coated with an optically opaque material 12 and has at its tip an optical microscopic opening 13. In this probe also, the tube is fixed by a support part 18 so that the tube can be deformed or vibrated due to the tube springiness.

Figure 5A:
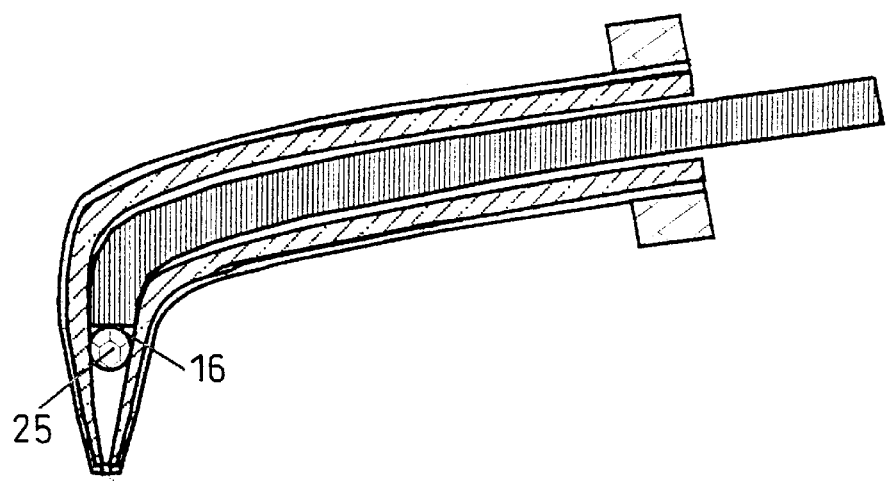
FIGS. 5A and 5B are typical views showing a structure of an optical probe of the present invention.
Figure 5B:
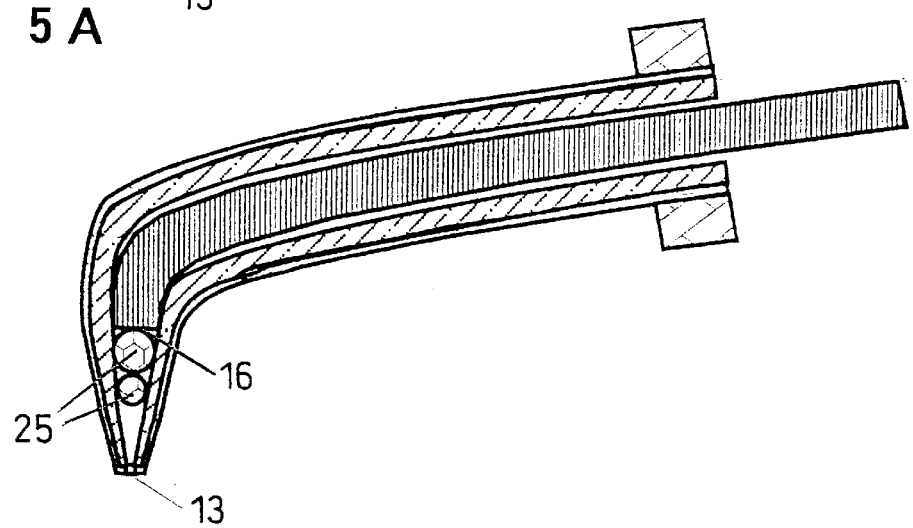

In this bent-formed probe, as shown in FIGS. 5A and 5B, it is possible to insert a ball lens 25 between the inserted optical waveguide end face 16 and the microscopic opening 13 within the tube in order to enhance the efficiency of light propagation from the inserted optical waveguide end face 16 to the microscopic opening 13. FIG. 5A and FIG. 5B are examples illustrating typical views respectively having one and two ball lenses 25 inserted.

Figure 6:
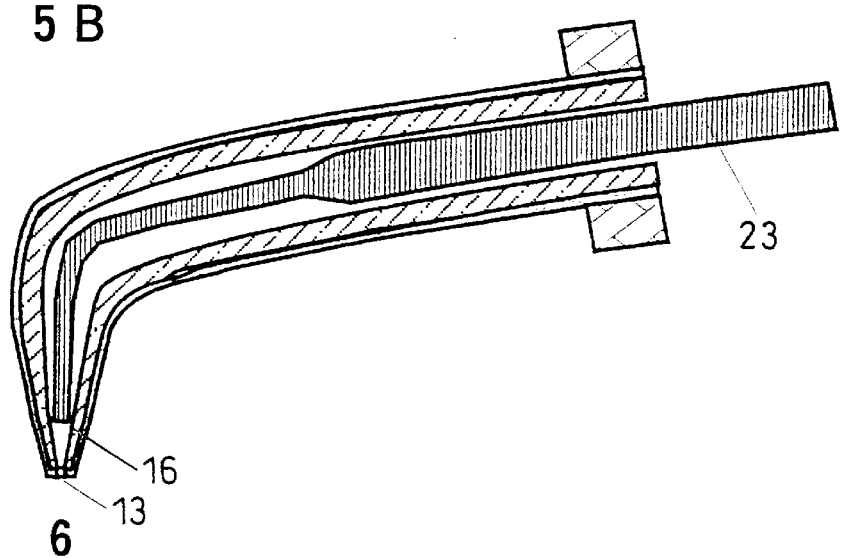
FIG. 6 is a typical view showing a structure of an optical probe of the present invention.

An optical probe shown in FIG. 6 is made to have an inserted waveguide end face 16 positioned closer to a microscopic opening 13. Similarly to the FIG. 2 case, the optical waveguide 23 has a core and clad, wherein part of the clad of the inserted waveguide is removed to partly reduce the diameter of the waveguide, thereby enabling the waveguide to be inserted deeper. In particular, the reduction in diameter of the waveguide makes it possible to insert such a waveguide even into a bent tube. Due to this, the tube and the waveguide can be separately fabricated thereby improving manufacture efficiency or reducing running cost.

The method used to practically fix the tube with the waveguide includes a method that is shown in FIG. 7 in which a tube fixing part 18 and a waveguide fixing part 35 are disposed on a common fixing part 34. Also, as another fixing method, it is possible to fix through an adhesive 36 between the tube 14 and the waveguide 17 at a tube end where the waveguide is inserted, as shown in FIG. 8.

For the probes as described above, glass can be used as a tube material. In the case of a glass tube, a hollow, sharp tip form can be easily formed by applying tension at respective ends of the tube with it heated up using carbonic acid gas laser light or the like. Where bending the tube, it can be bent by locally heating up using $CO_2$ laser light.

Metal can be used as an optically opaque material. More specifically, metals that are formable by vacuum evaporation, sputter or electroless plating can be used, which include aluminum, chromium, gold, platinum, silver, titanium and nickel.

The probe size in particular can be a glass tube having, for example, an outer diameter of 210 microns and an internal diameter of 127 microns, in which an optical fiber with an outer diameter of 125 microns can be inserted. Where such a glass tube with this 210-micron outer diameter is used, provided that the distance from the fixing part 18 to the tip be 1–2 mm, the resonance frequency is approximately 5–20 kHz. Besides this, it is possible to use a glass tube having, for example, approximately an outer diameter of 120 microns and an inner diameter of 75 microns. In this case, an optical fiber, if inserted, is required to be reduced in diameter by etching to a size smaller than the inner diameter of the glass tube. Etching can be performed by immersing an optical fiber in a hydrogen fluoride solution. Also in the case of reducing the diameter of the optical waveguide at its inserted portion as shown in FIG. 2 or FIG. 6, it is possible to reduce the diameter by immersing the optical fiber in a hydrogen fluoride solution.

Meanwhile, the microscopic opening 13 can be formed to a size of approximately 50 nm to 1 micron when using a glass tube.

Now described is the procedure used in a method to manufacture a probe of the present invention.

The linear type optical probe of the invention can be basically manufactured by the process of (1) elongating and breaking a glass tube, (2) inserting a waveguide in the tube and (3) coating the tube with metal.

Meanwhile, a manufacturing method used for inserting a waveguide lastly includes the process of (1) elongating and breaking a glass tube, (2) coating the tube with metal and (3) inserting a waveguide. In this case, the tube and the waveguide therein can be separately fabricated before the final process, as stated before. This can increase manufacture efficiency and reduce running cost.

The bent type optical probe can be basically manufactured by the process of (1) elongating and breaking a glass tube, (2) inserting a waveguide therein, (3) bending the tube and (4) coating the tube with metal. Further, a manufacturing method used for inserting a waveguide lastly includes the process of (1) elongating and breaking a glass tube, (2) bending the tube, (3) coating the tube with metal and (4) inserting a waveguide therein.

This method for manufacturing a bent type optical probe can have added, thereto as required, a mirror forming process following the tube bending process.

Now, a structure of a scanning proximity field optical microscope using a probe according to the invention will be described. In FIG. 9, the probe 41 according to the invention is placed with its microscopic opening 13 in close proximity to a surface of a sample plate 42. The main spring element of the probe 41 is placed horizontal relative to the sample surface. On a side of the end face 44 of the waveguide 43 not inserted in the tube, an optical system is arranged which includes a light source 45, a filter 46, a lens 47, and so on, thereby introducing light onto the waveguide end face 44. As a result of this, light is irradiated through the microscopic opening 13 to the sample surface. In the FIG. 9 example, a focusing lens 51 and a filter 52 are arranged under the sample plate 42 so that the light transmitted through the sample is collected and detected in light intensity by a photo detector 53.

The apparatus structure of FIG. 9 has a displacement detecting means which supplies an alternating current signal to a vibration applying piezoelectric element 61 to vibrate the probe 41. The vibration is detected by a detecting piezoelectric element 62. The probe-to-sample distance can be controlled by varying the vibration.

The sample plate 42 is movable in XYZ directions by a probe-sample relative moving means 48, and can be scanned in an XY plane by a controller 49 and automatically controlled in Z-directional distance along a sample surface geometry. Simultaneous with the distance control, acquisition of a detected optical signal is also made. Based on a Z-direction control signal corresponding at this time to an XY coordinate, a geometrical image can be obtained. Thus an optical image is obtainable from the optical signal. Meanwhile, the relative moving means uses a micrometer or stepping motor as a rough movement mechanism and a piezoelectric element as a fine movement mechanism.

The focusing optical system in a modified form can detect a light intensity of a reflected light by collecting it on a photo detector 56 wherein light is irradiated through the microscopic opening 13 onto the sample plate 42 surface where the light is reflected and then passed through a focusing lens 54 and a filter 55.

FIG. 10 shows a structure of a scanning proximity field optical microscope using a bent formed probe. In FIG. 10, a probe 41 of the invention has the microscopic opening 13 placed in close proximity to a surface of a sample plate 42, similarly to FIG. 9. The probe 41 has its main spring element arranged horizontal relative to the sample surface. On a side of the end face 44 of the waveguide 43 not inserted in the tube, an optical system is arranged which includes a light source 45, filter 46, a lens 47, and so on, thereby introducing light onto the waveguide end face 44. As a result of this, light is irradiated through the microscopic opening 13 to the sample surface. As in the example of FIG. 9, a focusing lens 51 and a filter 52 are arranged under the sample plate 42 so that the light transmitted through the sample is collected and detected in light intensity by a photo detector 53.

This example uses an optical lever as a displacement detecting means. A beam from the light source 71 is impinged on a mirror surface 33 so that the reflected light is detected in displacement as a probe displacement by a split type optical detector 72. Even where this bent type probe is used, it is naturally possible to use a piezoelectric detecting method.

The sample plate 42 is movable in XYZ directions by a probe-sample relative moving means 48, and can be scanned in an XY plane by a controller 49 and automatically controlled in Z-directional distance along a sample surface geometry. Simultaneous with the distance control, acquisition of a detected optical signal is also made. Based on a Z-direction control signal corresponding at this time to an XY coordinate, a geometrical image can be obtained. Thus an optical image is obtainable from the optical signal. Meanwhile, the relative moving means uses a micrometer or stepping motor as a rough movement mechanism and a piezoelectric element as a fine movement mechanism.

The focusing optical system in a variation form can detect a light intensity of a reflected light by collecting it on a photo detector 56 wherein light is irradiated through the microscopic opening 13 onto the sample plate 42 surface where the light is reflected and then passed through a focusing lens 54 and a filter 55.

The focusing optical system used in the above structural examples can use a reflection type lens (Cassegrain lens) besides a lens formed of glass or crystalline material. Accordingly, the above systems can be employed in an ultraviolet or infrared range while reflecting the probe characteristic of the invention.

Although the probe displacement detection in the above examples used the piezoelectric detecting method and the optical lever method, besides these other displacement detecting method such as a light interference method may be employed.

By using a waveguide material that propagates an ultraviolet or infrared portion of light for the apparatus structured as above, it is possible to observe at the same time on optical resolving power of optical information in the ultraviolet or infrared range and sample surface geometrical images. Furthermore, where using a bent type probe, if a detection element and a modulation circuit/lock-in amplifier is used, it is possible to simultaneously conduct observation of physical information such as friction, viscoelasticity, surface potential, etc. For example, for friction measurement a four-split optical detector is used to detect a probe torsion component.

Finally, explanation is made that the probe of the invention has an effect as a high throughput optical probe. That is, in the case of a usual waveguide optical probe, a waveguide structurally exists which is sharpened at a tip with a given taper angle. Where the opening is smaller than a light wavelength, light attenuation extremely increases at the taper portion. Contrary to this, in the probe of the invention, the light transmissible through the tube can propagate over to the hollow opening and the diameter can be increased in the propagation region to the hollow opening. This light results in loss at the opening due to a ratio in area of the opening to the tube tip. However, because in a region the opening is sufficiently small the loss of light at the taper increases moreover, the optical throughput can be increased.

According to the present invention, the microscopic opening can be formed with high reproducibility, coping with observation on optical resolving power of optical information in a ultraviolet and infrared ranges while reflecting a merit of the hollow opening and observation on geometrical images. An optical probe easy to manufacture was realized. Where using the method of inserting a waveguide in the optical probe lastly, manufacture cost and running cost could be further suppressed.

What is claimed is:

1. An optical probe, comprising:
   a tube having a tip portion having a smaller diameter than an overall diameter of the tube, the tube being bent proximate the tip portion;
   an optically opaque material coated on the tube;
   a microscopic opening formed at the tip portion of the tube; and
   an optical waveguide having at least two opposed optical end surfaces and having a core and a clad covering the core;
   wherein the optical waveguide at one end surface is inserted in the tube facing the microscopic opening, and a portion of the clad of the waveguide which is inserted in the tube is partly removed so that the part of the waveguide that is inserted in the tube is smaller in diameter than the remainder of the waveguide.

2. An optical probe according to claim 1; further comprising a ball lens disposed between the end surface of the waveguide inserted in the tube and the microscopic opening formed in the tube.

3. An optical probe according to claim 1; further comprising a reflection mirror formed on the tube.

4. An optical probe according to claim 1; wherein the tube is fixed by a support member, and the tube has a spring characteristic.

5. An optical probe according to claim 1; wherein the tube and the waveguide are fixed on a common fixing part.

6. An optical probe according to claim 1; wherein the tube and the waveguide are adhesion-fixed at an end of the tube at which the waveguide is inserted therein.

7. An optical probe according to claim 1; wherein the optically opaque material is a metal.

8. An optical probe according to claim 1; wherein the waveguide is an optical fiber.

9. A method for manufacturing an optical probe, comprising the steps of:
   (1) elongating and breaking a glass tube to form a tube having a sharpened tip portion;
   (2) inserting a waveguide into the tube; and
   (3) coating the tube with a metal.

10. A method for manufacturing an optical probe, comprising the steps of:
    (1) elongating and breaking a glass tube to form a tube having a sharpened tip portion;
    (2) coating the tube with a metal; and
    (3) inserting a waveguide into the tube.

11. A method for manufacturing an optical probe, comprising the steps of:
    (1) elongating and breaking a glass tube to form a tube having a sharpened tip portion;
    (2) inserting a waveguide into the tube;
    (3) bending the tube proximate the tip portion; and
    (4) coating the tube with a metal.

12. A method for manufacturing an optical probe according to claim 11; further comprising the step of forming a mirror on the tube after the tube bending step.

13. A method for manufacturing an optical probe, comprising the steps of:
    (1) elongating and breaking a glass tube to form a tube having a sharpened tip portion;
    (2) bending the tube proximate the tip portion;
    (3) coating the tube with a metal; and
    (4) inserting a waveguide into the tube.

14. A method for manufacturing an optical probe according to claim 13; further comprising the step of forming a mirror on the tube after the tube bending step.

15. A scanning proximity field optical microscope, comprising: a probe; a light source; a focusing optical system; a relative moving means for causing relative movement between the probe and a sample; a photo detector; a probe displacement detecting means for detecting displacement of the probe as it undergoes relative movement with respect to the sample surface; wherein the probe comprises a glass tube coated with an optically opaque material and having an optical microscopic opening formed at a tip portion thereof, and an optical waveguide having at least two optical end surfaces, one end surface of the waveguide being inserted in the glass tube facing the microscopic opening.

16. A scanning proximity field optical microscope according to claim 15, wherein the tube is bent proximate the tip portion.

17. An optical probe, comprising: a glass tube having a reduced diameter tip portion and a microscopic aperture formed at the tip portion, the tube being bent proximate the tip portion; an opaque metal coated on the glass tube except for the microscopic aperture; and an optical waveguide having a core and a clad covering the core and having a portion of the clad removed at one end and inserted at the one end into the glass tube so that only the exposed core extends into the bent portion of the glass tube and is disposed proximate the microscopic aperture.

18. An optical probe according to claim 17; further comprising a reflection mirror formed on the glass tube.

19. An optical probe according to claim 17; wherein the tube has a spring characteristic and is supported by a support member.

20. An optical probe according to claim 17; wherein the tube and the waveguide are affixed to each other by a common fixing part.

21. An optical probe according to claim 17; wherein the tube and the waveguide are adhered at an end of the tube at which the waveguide is inserted.

22. An optical probe according to claim 17; wherein the opaque material is a metal.

23. An optical probe according to claim 17; wherein the waveguide is an optical fiber.

24. An optical probe according to claim 17; wherein the glass tube is formed by elongating and breaking a glass tube to form the tube with the reduced diameter tip portion.

25. An optical probe according to claim 24; wherein the glass tube is bent after the optical waveguide is inserted therein.

* * * * *